(12) United States Patent
Luo et al.

(10) Patent No.: US 12,034,769 B2
(45) Date of Patent: Jul. 9, 2024

(54) SYSTEMS AND METHODS FOR SCALABLE ZERO TRUST SECURITY PROCESSING

(71) Applicant: Fortinet, Inc., Sunnyvale, CA (US)

(72) Inventors: Wenping Luo, Burnaby (CA); Robert May, Burnaby (CA); Kunal Marwah, Burnaby (CA)

(73) Assignee: Fortinet, Inc., Sunnyvale, CA (US)

(*) Notice: Subject to any disclaimer, the term of this patent is extended or adjusted under 35 U.S.C. 154(b) by 164 days.

(21) Appl. No.: 17/242,268

(22) Filed: Apr. 27, 2021

(65) Prior Publication Data
US 2022/0345491 A1    Oct. 27, 2022

(51) Int. Cl.
*H04L 29/00* (2006.01)
*H04L 9/40* (2022.01)

(52) U.S. Cl.
CPC .......... *H04L 63/20* (2013.01); *H04L 63/0823* (2013.01); *H04L 63/0272* (2013.01); *H04L 63/0281* (2013.01)

(58) Field of Classification Search
CPC ............... H04L 63/20; H04L 63/0823; H04L 63/0272; H04L 63/0281
See application file for complete search history.

(56) References Cited

U.S. PATENT DOCUMENTS

| | | | |
|---|---|---|---|
| 2021/0281576 A1* | 9/2021 | Shravan | H04L 63/20 |
| 2022/0029988 A1* | 1/2022 | Levin | H04L 63/166 |
| 2022/0191202 A1* | 6/2022 | Peterson | G06F 21/45 |
| 2023/0123781 A1* | 4/2023 | Kaimal | H04L 63/02 726/12 |

* cited by examiner

*Primary Examiner* — Brandon Hoffman
*Assistant Examiner* — Helai Salehi
(74) *Attorney, Agent, or Firm* — Jaffery Watson Mendonsa & Hamilton LLP (57) ABSTRACT

Various approaches for providing scalable network access processing. In some cases, approaches discussed relate to systems and methods for providing scalable zero trust network access control.

19 Claims, 6 Drawing Sheets

SYSTEMS AND METHODS FOR SCALABLE ZERO TRUST SECURITY PROCESSING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments of the present invention generally relate to network security, and more particularly to scalable zero trust security processing.

BACKGROUND

Zero trust network access processing has been proposed where device characteristics are considered in relation to user characteristics to determine network access. Such systems generally rely heavily on centralized control, and as such are not easily scalable to larger network implementations.

Thus, there exists a need in the art for more advanced approaches, devices and systems for providing network access processing.

SUMMARY

Various embodiments provide systems and methods for performing network access control. In some cases, embodiments discussed relate to systems and methods for providing scalable zero trust network access control.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for performing network access control. In some cases, embodiments discussed relate to systems and methods for providing scalable zero trust network access control.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In some embodiments, the solution is a "secure" solution meaning that UTM, threat, and/or malware scans are integrated with the zero trust processing.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "endpoint device" is used in its broadest sense to mean any hardware device that may be used to access a network. Such devices may include, but are not limited to, desktop computers; mobile phones, laptop computers, or tablet computers. Based upon the disclosure provided herein, one of ordinary skill in the art will recognize a variety of endpoint devices that may be used in relation to different embodiments.

The phrases "endpoint agent" or "EA" are used in their broadest sense to mean a software, hardware, or combination software/hardware product executing on an endpoint device. In some embodiments, an endpoint agent may be incorporated in a larger application executing on the endpoint device. As one particular example, an endpoint agent may be a portion of functionality included in a software product such as, for example, FortiClient™. Based upon the disclosure provided herein, one of ordinary skill in the art will recognize a variety of endpoint agents and implementations thereof that may be used in relation to different embodiments.

The phrase "endpoint management system" is used in its broadest sense to mean any hardware device, software application, or combination hard/software that may be used to validate accessing devices. In some embodiments, the accessing devices are endpoints and an endpoint management system may provide validation for multiple endpoint devices. Such validation may include, but is not limited to, generating a device record for an endpoint device, and distributing the device records to one or more access nodes and/or the endpoint device itself. The device record may include, but is not limited to, a security posture of the endpoint device, one or more device tags associated with the endpoint device, and/or an indication of ownership of the endpoint device.

The phrase "access node" is used in its broadest sense to mean any hardware device, software application, or combination hard/software that may be used to control access to network devices, services and/or databases by a requesting endpoint device. In some cases, an access node is a virtual node or container that runs one or more access proxies. In various cases, such access proxies are layer 7 reverse proxies. Such a layer 7 reverse proxy can check, for example, endpoint device identity, user identity, enforce access proxy policy, and/or performing security scans and audition for each session from endpoint to a backend network service. Based upon the disclosure provided herein, one of ordinary skill in the art will recognize a variety of access nodes and implementations thereof that may be used in relation to different embodiments.

The phrase "micro-segmentation" is used in its broadest sense to mean any process of creating zones in organization networks, data centers and/or cloud environments to isolate workloads from one another and secure them individually.

The phrase "security posture" is used in its broadest sense to mean an accounting of security vulnerabilities and/or security protections existing on a given device. Thus, as just one example, a security posture may include an indication of an out of date operating system executing on an endpoint device. As another example, a security posture may indicate an insecure application executing on an endpoint device. As yet another example, a security posture may indicate a vulnerable hardware element included as part of an endpoint device. As yet a further example, a security posture may indicate an up to date virus detection and mitigation application executing on an endpoint device. Based upon the disclosure provided herein, one of ordinary skill in the art will recognize a variety of indications and combinations of indications that may be incorporated in a security posture.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for zero trust security processing for an endpoint device in a network. The methods include receiving, by a processing device, a request from an endpoint device. The endpoint device includes an endpoint agent executing on the endpoint device, and the endpoint agent is configured to update a security posture of the endpoint device. The request includes the security posture of the endpoint device. The methods further include updating a device record corresponding to the endpoint device to reflect the security posture received from the endpoint device. In some instances of the aforementioned embodiments, the security posture includes one or more of: an indication of an out of date operating system executing on the endpoint device, an insecure application executing on the endpoint device, a vulnerable hardware element included as part of the endpoint device, and/or an up to date virus detection and mitigation application executing on the endpoint device.

In some instances of the aforementioned embodiments, the methods further include determining, by the processing device, an owner of the endpoint device based at least in part on information received as part of the request from the endpoint device. In such instances, updating the device record is done based in part upon the owner. In various instances, determining the owner is done by accessing a network database.

In one or more instances of the aforementioned embodiments, the request from the endpoint device is a request to register the endpoint device. In some such instances, the methods may further include: generating, by the processing device, a security certificate for the endpoint device; and transmitting, by the processing device, the security certificate to the endpoint agent on the endpoint device. In various instances of the aforementioned embodiments, the request from the endpoint device is an initial request from the endpoint device. In some such instances, the methods may further include: generating, by the processing device, a security certificate for the endpoint device; and transmitting, by the processing device, the security certificate to the endpoint agent on the endpoint device. In various cases, the methods further include installing the security certificate into a register of the endpoint agent.

In some instances of the aforementioned embodiments where the request is a first request and the processing device is a first processing device, the methods further include: receiving, by a second processing device, a second request from the endpoint device, where the second request requests access to a network service that includes the security certificate; formatting, by the second processing device, a device record request based at least in part on information derived from the security certificate; and issuing, by the second processing device, the device record request. In some cases, the methods further include: receiving, by the first processing device, the device record request; and providing, by the first processing device, the device record in response to the device record request. In one or more instances of the aforementioned embodiments, the methods further include: receiving, by the second processing device, the device record; and granting, by the second processing device, access to the network service based at least upon a combination of the security certificate and the device record. In some cases the first processing device is an endpoint management system, the second processing device is an access node, and the endpoint management system and the access node are communicably coupled.

Other embodiments provide systems for zero trust security processing for an endpoint device in a network. Such systems include an endpoint device having a first processing device and a non-transitory computer readable storage medium. The non-transitory computer readable medium includes instructions which when executed by the first processing device cause the endpoint device to: update a security posture of the endpoint device; provide the security posture of the endpoint device to a second processing device; receive a security certificate generated based at least in part on the security posture of the endpoint device; and provide the security certificate to a third processing device as part of a request to access a network. In some cases, the security posture includes one or more of: an indication of an out of date operating system executing on the endpoint device, an insecure application executing on the endpoint device, a vulnerable hardware element included as part of the endpoint device, and/or an up to date virus detection and mitigation application executing on the endpoint device.

In some instances of the aforementioned embodiments, the security certificate is generated by the second processing device based at least in part on the security posture of the endpoint device and an owner of the endpoint device. In one or more instances of the aforementioned embodiments, the second processing device generates a device record for the endpoint device based at least in part on the security posture of the endpoint device and an owner of the endpoint device, and the third processing device requests the device record based at least in part on the security certificate received from the endpoint device. In some cases, the second processing device and the third processing device are the same device. In various instances of the aforementioned embodiments, the second processing device is included in an endpoint management system, the second processing device is included in an access node, and the endpoint management system and the access node are communicably coupled.

Yet other embodiments provide a non-transitory computer-readable storage medium embodying a set of instructions, which when executed by one or more processing resources of a computer system, causes the one or more processing resources to perform a method including: receiving, by a processing device, a request from an endpoint device, wherein the endpoint device includes an endpoint agent executing on the endpoint device, where the endpoint agent is configured to update a security posture of the endpoint device, and where the request includes the security posture of the endpoint device; and updating a device record corresponding to the endpoint device to reflect the security posture received from the endpoint device.

Figure 1A:
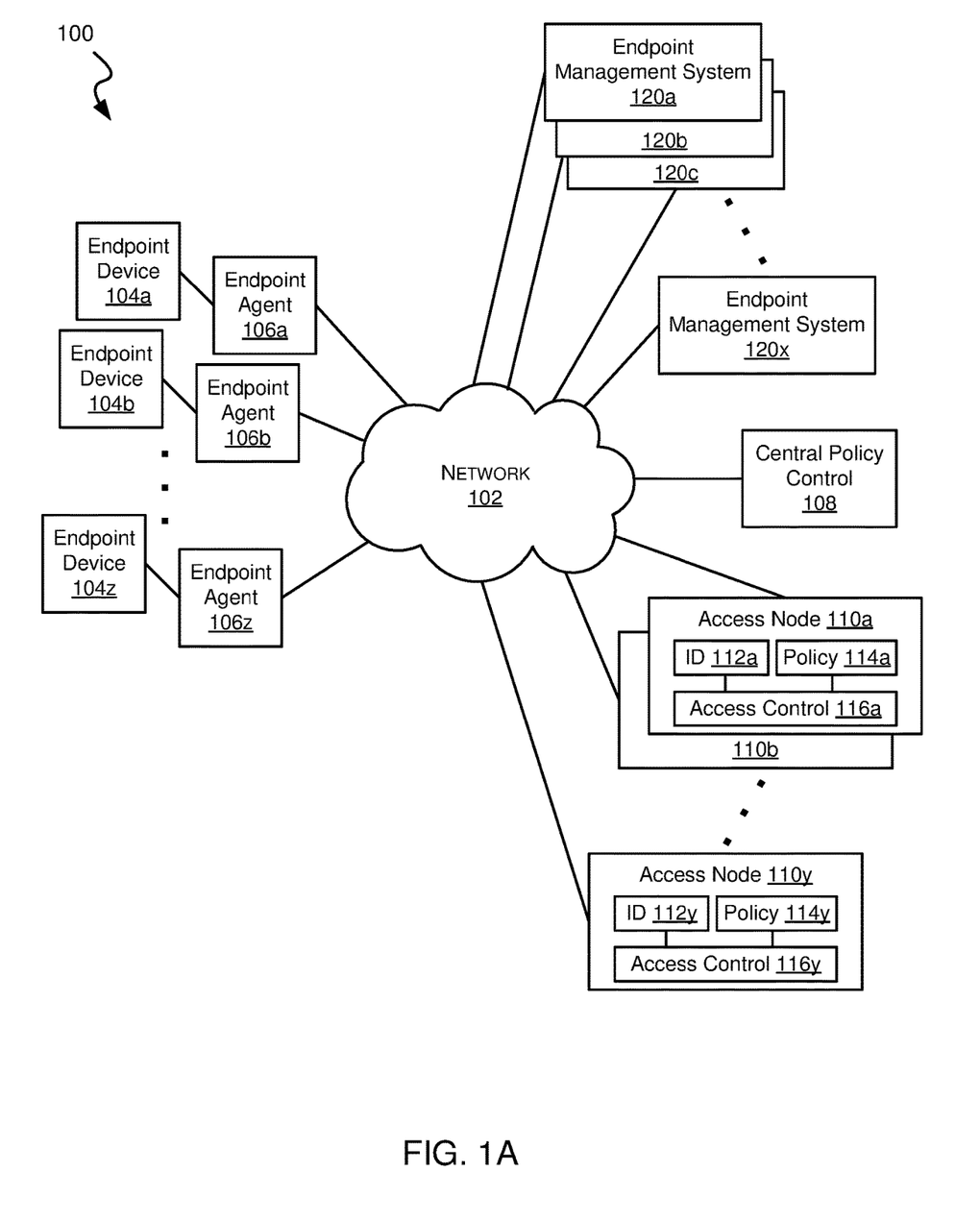
FIGS. 1A-E illustrate a network architecture capable of scalable implementation of zero trust network access processing using a combination of an endpoint agent, one or more endpoint management systems, and one or more access nodes in accordance with some embodiments.

Turning to FIG. 1A, network architecture 100 capable of scalable implementation of zero trust network access processing is shown in accordance with some embodiments. As shown, network architecture 100 includes a number of endpoint devices 104 (e.g., endpoint devices 104a, 104b, . . . , 104z where "z" represents a total number of endpoint devices 104), endpoint management systems 120 (e.g., endpoint management systems 120a, 120b, 120c, . . . , 120x where "x" represents a total number of endpoint management systems 120), and access nodes 110 (e.g., access nodes 110a, 110b, 110c, . . . , 110y where "y" represents a total number of access nodes 110) all communicably coupled via a network 102.

In addition, network 100 includes a central policy control 108 which provides a single access point for defining network policies. Central policy control 108 may be implemented as a software application executing on a network device along with other applications. In some cases, central policy control 108 supports a graphical user interface that allows someone administrating the network to enter and change network policies. Based upon the disclosure provided herein, one of ordinary skill in the art will recognize a variety of implementations (including both hardware and software implementations) that may be used in relation to different embodiments.

Network policies modified by and propagated by central policy control 108 include, but are not limited to, defining access granted based upon a combination of user identification and endpoint device identification. In some embodiments, endpoint management systems 120, access nodes 110, and central policy control 108 may be implemented as part of a commonly controlled network. In some cases, administration of the aforementioned commonly controlled network includes assigning ownership of endpoint devices 104, applying digital device tags to endpoint devices 104, and/or installing an endpoint agent 106 (e.g., endpoint agents 106a, 106b, . . . , 106z) on each of the endpoint devices 104.

Network 102 may be any type of network or combination of networks. For example, network 102 may include a combination of a home network accessed by a particular endpoint device 104; a corporate network that connects a subset of endpoint management systems 120, access nodes 110, and central policy control 108; and/or the Internet connecting the home network to the corporate network. As another example, network 102 may be a single corporate network. Further, those skilled in the art will appreciate that network 102 can be: a wireless network, a wired network, or a combination of wired and wireless networks that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Based upon the disclosure provided herein, one of ordinary skill in the art will recognize a variety of network types, network combinations, and/or connections that may be included as part of network 102.

Access nodes 110 each include an access control module 116, an identity module 112, and a policy module 114. Access control module 116 is configured to receive access information from a user and/or an endpoint device 104 requesting access via access node 110, and either granting or denying access based upon the user data and/or a response from identification module 112. Identification module 112 is configured to receive identity information about the user and/or the endpoint device 104 requesting access via access node 110, and determining what level of access is allowable based upon policies accessed from policy module 114.

Policy module 114 is configured to include relevant policies from central policy control 108. In some embodiments, a "push" model for updating policy modules 114 is used where central policy control 108 sends any policy changes to respective policy modules 114. In other embodiments, a "pull" model for updating policy modules 114 is used where each policy module 114 periodically requests any policy updates from central policy control 108. Based upon the disclosure provided herein, one of ordinary skill in the art will recognize a variety of approaches for updating policy modules 114.

Figure 1B:
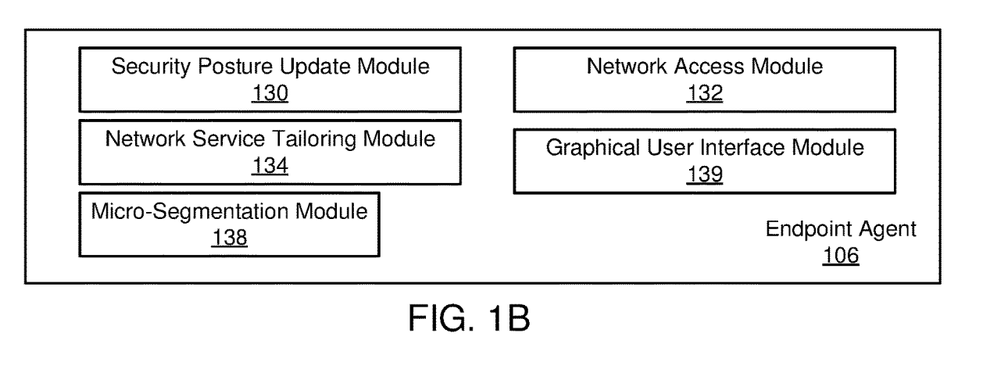

Turning to FIG. 1B, functional modules of an endpoint agent 106 are shown in accordance with some embodiments. A security posture update module 130 is configured to register endpoint device 104 on which endpoint agent 106 is executing with endpoint management system 120. In particular, security posture update module 130 is configured to monitor endpoint device 104 and update the security posture of endpoint device 104. As endpoint device 104 is capable of changing by adding new applications and hardware, and as applications and hardware can become out of date where newly provided updates are not installed on endpoint device 104, endpoint agent 106 continually monitors the status of endpoint device 104 to detect any changes that impact the security posture of endpoint device 104. The security posture indicates one or more vulnerabilities and/or capabilities of endpoint device 104. Security posture update module 130 of endpoint agent 106 determines this security posture by accessing various registries of endpoint device 104 to identify applications executing on endpoint device 104 and the version of the applications, hardware included in endpoint device 104 and the version of hardware, and/or networks accessed by endpoint device 104. Based upon the disclosure provided herein, one of ordinary skill in the art will recognize a variety of approaches that may be used for identifying security capabilities and/or vulnerabilities of endpoint device 104 that may be used in relation to different embodiments Security posture update module 130 of endpoint device 106 determines whether the security posture has changed. This may be determined, for example, by security posture update module 130 comparing newly collected security posture information with that which was previously collected. Where the security posture has changed, security posture update module 130 accesses a list of endpoint management systems accessible to endpoint device 104. In some embodiments, the list of endpoint management systems is included with endpoint agent 106 when it is installed on endpoint device 104. In various cases, the list of endpoint management systems is updated periodically. Such periodic updates may be done, for example, when endpoint device 104 accesses an endpoint management system 120.

Security posture update module 130 of endpoint agent 106 selects an endpoint management system 120 from the accessed list of endpoint management systems. In some cases, the selection of one of the endpoint management systems 120 is based upon, for example, a home location of endpoint device 104, the current location of endpoint device 104, and/or availability of a particular endpoint management system 120. Based upon the disclosure provided herein, one of ordinary skill in the art will recognize a variety of approaches that may be used to select one endpoint management system 120 from the list of endpoint management systems.

Security posture update module 130 of endpoint agent 106 transmits a request to the selected endpoint management system 120. The request may be transmitted using any network protocol supported by both endpoint agent 106 and the selected endpoint management system 120. The request includes: the updated security posture of endpoint device 104, and a request to register endpoint device 104 with endpoint management system 120 where it is the first time endpoint agent 106 has accessed the particular endpoint management system 120. The request to register endpoint device 104 may include a license token used to identify endpoint device 104.

The registration process is performed by endpoint management system 120 and includes using one or more of: a license token received from endpoint agent 106, identification of endpoint agent 106 as an authorized pre-installed device, and/or querying a central lightweight directory access protocol (LDAP) directory of device information. Based upon the disclosure provided herein, one of ordinary skill in the art will recognize a variety of approaches for identifying endpoint device 104 to endpoint management system 106. Where endpoint management system 120 is able to identify and validate endpoint device 104 and it is the first time that endpoint agent 106 has accessed the particular endpoint management system 120, endpoint management system 120 is identified as the active endpoint management system for endpoint device 104, and endpoint management system 104 issues a device certificate or session certificate to endpoint agent 106. Security posture update module 130 of endpoint agent 106 installs the certificate issued by endpoint management system 120 into appropriate directories of endpoint agent 106 so that endpoint agent 106 will automatically use the issued certificate for later network accesses via access nodes 110.

A device certificate may be, but is not limited to, a transport layer security (TLS) certificate issued by endpoint management system 120 to the specific endpoint agent 106. A unique device identification assigned to endpoint device 104 is embedded in the device certificate. Later when the device certificate is presented to an access node 110 as part of a network access request, the device certificate is validated using an endpoint management system certificate authority and the device identification embedded in the device certificate is used to identify endpoint device 104 to access node 110. A session certificate is a special certificate that issued by endpoint management system 120 after a user logs into endpoint management system 120 on a specific certificate. In such a case, both user name (i.e., the user logging in using the endpoint device) and the device identification are embedded into the session certificate. An access node 110 can identify both the user and endpoint device 104 from a validated session certificate without user authentication. The issued certificates are issued to the requesting endpoint agent 106.

In addition, endpoint management system 120 generates a device record for endpoint device 104 based upon the security posture of endpoint device 104 that was provided by registration module of endpoint agent 106. Such a device record may contain, for example, the security posture provided by endpoint agent 106, an indication of ownership of endpoint device 104, the device identification, and/or other relevant information about endpoint device 104. Endpoint management system 120 updates the device record to include the latest information about endpoint device 104. This device record may be retrieved from endpoint management system 120 by, for example, an access node 110 through which endpoint device 104 is attempting to access network 102. Retrieval may be done using, for example, the device identification embedded in the certificate issued to endpoint agent 106 and included in the device record. The information in the device record can be used by an access node 110 to determine policy compliance with differing levels of network access for network 102.

Where security posture update module 130 determines that the security posture has not changed, endpoint agent 106 determines whether endpoint device 104 is attempting to access a secure portion of network 102. In some embodiments, a user of endpoint device 104 selects a login access for a secure portion of network 102, and when this occurs endpoint agent 106 executing on endpoint device 104 detects the network access selection by the user. Based upon the disclosure provided herein, one of ordinary skill in the art will recognize a variety of approaches that may be used for determining that a request for access to a secure network has been received.

A network access module 132 is configured to access a listing of access nodes available to endpoint device 104, and to learn and select an access node 110 from the listing of access nodes for use by endpoint device 104. A graphical user interface (GUI) module 139 is configured to drive a display included as part of endpoint device 104, and to receive and process inputs received via the display of endpoint device 104.

Where endpoint agent 106 determines that a network access has been requested, network access module 132 accesses a list of access nodes. This list of access nodes may be maintained locally by endpoint agent 106, and the list can be updated each time endpoint agent 106 accesses its active endpoint management system 120. In some cases, endpoint management systems 120 dynamically update a list of access nodes by monitoring access node availability using a secure connection between endpoint management system 120 and an access node 110. Based upon the disclosure provided herein, one of ordinary skill in the art will recognize a variety of approaches for identifying access nodes 110 that may be used in relation to different embodiments. In some embodiments, network access module 132 of endpoint agent 106 selects an access node 110 from the list of access nodes. In other embodiments, GUI module 139 of endpoint agent 106 displays the list of access nodes via a GUI of endpoint device 104, and a user is prompted to select one of the displayed access nodes.

Network access module 132 of endpoint agent 106 requests network access via the selected access node 110. The request may include both user authentication information and device identification data. Such user authentication data may include, but is not limited to, a user name and password. The device identification data may include, but is not limited to, the device certificate issued by endpoint management system 120. Access node 110 uses the combination of the user login and the issued certificate to determine a level of network access based upon network policies. This process of determining the level of network access is described below in relation to FIG. 4.

Where network access is granted by access node 110, a list of network services is accessed by a network service tailoring module 134. Network service tailoring module 134 is configured to automatically configure network services and to process network requests by endpoint device 104. Such a list of network services may be provided by access node 110 to endpoint agent 106. In some cases, the list of network services provided by access node 110 is a subset of available network services where the subset is selected based upon the identity of the user (established by the prior process of authenticating the user to access node 110), the identity of endpoint device 104 (established by the device certificate provided by endpoint agent 106 to access node 110), or a combination of the identity of the user and the identity of endpoint device 104.

Network service tailoring module 134 of endpoint agent 106 selects a network service. In some cases, GUI module 139 of endpoint agent 106 may display a request to identify a network service to the GUI of endpoint device 104. A user may then select a network service via the GUI or another input device. Alternatively or in addition, network service tailoring module 134 may automatically select a network service based upon context and/or historical patterns of prior user selections. Proper selection of network services allows endpoint device 104 to provide desired services that include, but are not limited to: bypassing any existing virtual private network (VPN) to access a selected network service directly, and redirecting transmission control protocol (TCP) services other than native access proxy services through a hypertext transfer protocol secure (HTTPS) tunnel to an access node. Endpoint agent 106 applies the selected network service to a network session. Use of the network continues until the endpoint device 104 is disconnected from the network.

Using the selected network service provided by network service tailoring module 134, endpoint agent 106 intercepts TCP traffic for a network service on the list as a proxy automatically. In such a case, endpoint agent 106 builds a HTTPS tunnel to TCP forwarding access proxy. Similar to handling a native HTTPS access proxy, TCP forwarding access proxy works the same as a native HTTP access proxy in tunnel setup stage until an access policy is matched. If the policy blocks the traffic, access node 110 denies the access and may send friendly replacement message to endpoint agent 106. When the policy allows the access request to a backend network service that is embedded in a URL, the session is converted into TCP tunnel through HTTP messages. There are two choices to tunnel the traffic between EA and access proxy: (1) TCP traffic are forwarded back and force on top of SSL layer (this is a good choice if the TCP protocol is in plain text or not secure enough), or (2) TCP traffic is forwarded back and force as raw data and the SSL layer is destroyed (this is a good choice as the TCP protocol itself are as secure as HTTPS so that it has higher performance to avoid double encryptions). If security scans are enabled for the traffic, access node 110 can deeply inspect tunneled traffic using any applications known in the art and audit the traffic as required. Based upon the disclosure provided herein, one of ordinary skill in the art will recognize a variety services proxies that may be supported in accordance with different embodiments.

A micro-segmentation module 138 is configured to support micro-segmentation for endpoint device 104. Endpoint device 104 may have a host firewall that is part of endpoint agent 106. The host firewall can load different set of firewall policies from endpoint management system 120 based on a consistent zero trust strategy. Before endpoint agent 106 reaches to its active endpoint management system 120, the host firewall does not allow any inbounding traffic in order to protect itself from unknown risks. When endpoint agent 106 connects to its active endpoint management system 120, the host firewall loads a proper set of firewall policies after it is placed into a network segment. With or without firewalls to control traffic crossing networks, the strategy can balance security policy granularity so that it can be managed easily and at the same time provides very efficient access control and isolate risks dynamically.

In some cases such micro-segmentation is done on secure sockets layer (SSL) virtual private network (VPN) of Internet protocol security (IPSEC) VPN networks. In such a deployment scenario, endpoint agent 106 connects to endpoint management system 120, finishes endpoint agent 106 registration and installs an issued device certificate properly before it starts to connect to VPN server. The VPN server is a type of access node 110 in the system.

When endpoint agent 106 connects to the VPN server, the VPN server can implement multiple virtual VPN switches. Each VPN switch attaches to a different network. The VPN server will put endpoint agent each host to a proper VPN switch dynamically based on device identity and user identity learned from tunnel negotiation and user authentication during VPN tunnel setup. The VPN server can learn the device record including its security posture from endpoint management system 120 and assigns an IP address to endpoint agent 106 on a specific network, and endpoint agent 106 loads a proper set of firewall policies from endpoint management system 120.

In various cases the micro-segmentation is done on WiFi access networks. In such a deployment scenario, before endpoint device 104 device joins the WiFi networks through a WiFi access point (a form of an access node 110), it may or may not have finished endpoint agent 106 registration, installed device certificate and cached necessary information that may be out of date. When endpoint device 104 connects to the WiFi access point, the WiFi access point can put endpoint device 104 into a proper network dynamically based on device identity and user identity learned from 802.1x endpoint agent 106P-TLS negotiation. If endpoint agent 106 has not previously performed endpoint agent 106 registration with endpoint management system 120, the identity of endpoint device 104 may be unknown. As an access node 110, the WiFi access point can learn the device record including its security posture from endpoint management system 120 where device identity is known. The WiFi access point can place the device into a proper virtual local area network (VLAN) and assign an IP address to endpoint device 104 through a pool or dynamic host configuration protocol (DHCP).

As endpoint agent 106 connects to endpoint management system 120, endpoint agent 106 may register to endpoint management system 120 and update its security posture. If endpoint management system 120 detects new or updated security posture, it notifies the WiFi access point and the WiFi access point will start procedure to place the device into an adjusted VLAN and assign IP address to the device on the VLAN through a pool or DHCP. Endpoint agent 106 loads a proper set of firewall policies from endpoint management system 120 after settling down to a stable VLAN.

In some cases the micro-segmentation is done in a physical network switch (i.e. an instance of an access node). In such a deployment scenario, two endpoint device 104 won't be allowed to connect directly on the same local area network (LAN). Rather, an endpoint device 104 connects to the LAN through a physical network switch. Before an endpoint device 104 joins local networks through a physical network switch, it may or may not have finished endpoint agent 106 registration, installed device certificate and cached necessary information that may be out of date.

When endpoint device 104 plugs into the physical network switch, the physical network switch can put endpoint device 104 into a proper network dynamically based on device identity and user identity learned from 802.1x endpoint agent 106P-TLS negotiation. If endpoint agent 106 has not previously registered with endpoint management system 120, the identity of endpoint device 104 may be unknown. As an access node 110, the physical network switch can learn the device record including its security posture from endpoint management system 120 if device identity is known. Network switch can place the device into a proper VLAN and assign IP address to the device on the VLAN through a pool or DHCP. As endpoint agent 106 connects to endpoint management system 120, endpoint management system 120 may perform endpoint agent 106 registration and update the security posture of endpoint device 104. If endpoint management system 120 detects new or updated security posture, it notifies the physical network switch and the physical network switch will start procedure to place the device into an adjusted VLAN and assign IP address to the device on the VLAN through a pool or DHCP. Endpoint agent 106 loads a proper set of firewall policies from endpoint management system 120 after settling down to a stable VLAN.

Figure 1C:
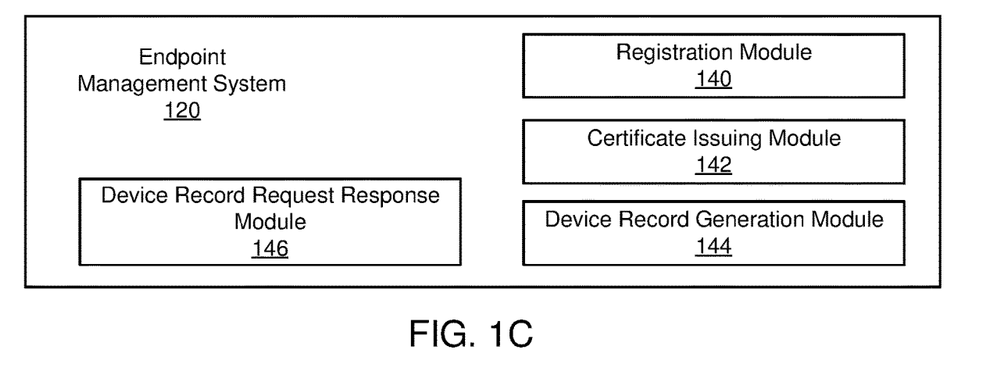

Turning to FIG. 1C, functional modules of an endpoint management system 120 are shown in accordance with various embodiments. A registration module 140 is configured to register endpoint devices 104 based upon information received from an endpoint agent 106 executing on the endpoint device 104. Registration module 140 of endpoint management system 120 detects that a request to register and/or update a security posture has been received from an endpoint agent 106. Where the request is from endpoint agent 106 that has not previously registered with endpoint management system 120, it is considered a registration request which includes generation of a device record based upon a security posture provided as part of the request. Alternatively, where the request is from an endpoint agent 106 that has previously registered with endpoint management system 120, it is considered an update request which includes updating the device record based upon the security posture provided as part of the request. In either case, the security posture for endpoint device 104 for which endpoint agent 106 is requesting is provided to and received by registration module 140 of endpoint management system 120.

In addition, one or more elements about endpoint device 104 are used by registration module 140 of endpoint management system 120 to identify an assigned owner of endpoint device 104. Determining the assigned owner may be done, for example, by accessing a network database using a device tag or other information provided by endpoint agent 106. Based upon the disclosure provided herein, one of ordinary skill in the art will recognize a variety of approaches for identifying device ownership that may be used in relation to different embodiments.

A device record generation module 144 is configured to generate and update device records for respective requesting endpoint devices. Where it is not the first time that endpoint agent has accessed endpoint management system 120, endpoint device 104 is already registered to endpoint management system 120 and endpoint management system 120 is the active endpoint management system for endpoint device 104. In such a case, endpoint management system 120 already includes a device record for endpoint device 104. Device record generation module 144 of endpoint registration system 120 updates the existing device record to reflect the recently received security posture and device ownership. Alternatively, where it is the first time that endpoint agent 106 has accessed endpoint management system 104, device record generation module 144 of endpoint registration system 120 registers endpoint device 120 and becomes the active endpoint management system for endpoint device 104. This includes generating a device record based upon the security posture and the device owner. Such a device record may contain, for example, the security posture provided by endpoint agent 106, an indication of ownership of endpoint device 104, the device identification, and/or other relevant information about the endpoint device 104. Registration module 140 of endpoint management system 120 updates the device record to include the latest information about endpoint device 104. This device record may be retrieved from endpoint management system 104 by, for example, an access node 110 through which endpoint device 104 is attempting to access the network. Retrieval may be done using, for example, the device identification embedded in the certificate issued to endpoint agent 106 and included in the device record. The information in the device record can be used by an access node 110 to determine policy compliance with differing levels of network access.

A certificate issuing module 142 is configured to issue certificates to respective requesting endpoint devices 104. Certificate issuing module 142 of endpoint management system 120 issues a certificate to endpoint agent 106. The certificate may be a device certificate or session certificate that is installed into appropriate directories of the endpoint agent so that the endpoint agent will automatically use the issued certificate for later network accesses via access nodes as more fully described below in relation to FIG. 2.

A device record request response module 146 responds to requests for device records. A device record request may include, for example, the unique device identification included in a certificate issued to an endpoint device 104. Thus, when endpoint device 104 attempts to access the network by providing its issued certificate to an access node 110, access node 110 can access the unique device identification in the certificate and use it to request the corresponding device record. Device record request response module 146 of endpoint management system 120 identifies endpoint device 104 that is the subject of the request using the unique device identification provided by a requesting access node 110. This request for the device record can be made: via direct communication between access node 110 and active endpoint management system 120; or indirectly where access node 110 requests the device record from any of the endpoint management systems which in turn obtains the device record from the active endpoint management system 120. Alternatively, the device record may be provided by endpoint management system 120 to endpoint agent 106 that registered with endpoint management system 120. When endpoint agent 106 attempts to access the network, it provides the device record to access node 110. In such a case, the device record may be signed by active endpoint management system 120 to protect the device record from unauthorized modification.

Device record request response module 146 of endpoint management system 120 accesses the device record for the identified endpoint device 104 and provides it to the requesting access node 110. This may be done, similar to that described above, either directly from the active endpoint management system or indirectly.

Figure 1D:
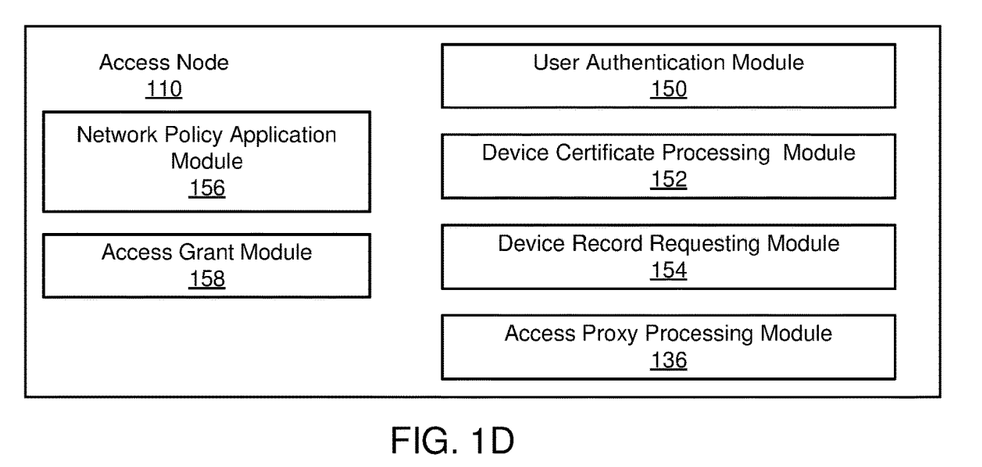

Turning to FIG. 1D, functional modules of an access node 110 are shown in accordance with various embodiments. A user authentication module 150 is configured to receive user authentication information from and endpoint agent and to use the received information to authenticate a user. User authentication module 150 of access node 110 uses the user authentication received as part of the access request to authenticate the user. This may be done using any user authentication known in the art.

A device certificate processing module 152 is configured to receive a device certificate from an endpoint agent 106 and to access endpoint device 104 information from the device certificate. Device certificate processing module 152 of access node 110 accesses the device identification that is embedded in the certificate issued by endpoint identification system 120, and provides it to a device record requesting module 154. In turn, device record requesting module 154 of access node 110 requests the device record for the device indicated by the device identification derived from the certificate. This request for the device record can be made: via direct communication between access node 110 and the active endpoint management system 120; or indirectly where access node 110 requests the device record from any of the endpoint management systems which in turn obtains the device record from the active endpoint management system 120. Alternatively, the device record may be provided by endpoint management system 120 to endpoint agent 106 that registered with endpoint management system 120. When endpoint agent 106 attempts to access the network, it provides the device record to access node 110. In such a case, the device record may be signed by active endpoint management system 120 to protect the device record from unauthorized modification.

A policy application module 156 determines a scope of network access that will be granted to the requesting endpoint device 104 based upon a combination of: the device record (e.g., the security posture of endpoint device 104, and/or ownership of endpoint device 104), user authentication, and network security policy received from central policy control 108. This determination of scope of access may be done in accordance with any zero trust security approach known in the art including, but not limited to, approaches used in BeyondCorp™ Enterprise systems. As suggested above, a grant of network access may vary in scope depending upon the combination of user authentication information and device identification data. For example, where the user authentication information is known to the network, but does not match the assigned owner of endpoint device 104, the access node may grant access to substantially all of the network, but not to download or upload source code to the network. As another example, where the user authentication information is both known to the network and matches the assigned owner of endpoint device 104, the access node may grant complete access to the network. As yet another example, where the user authentication information is known to the network and the device record indicates a low level of vulnerabilities, the access node may grant broad access to the network. In contrast, where the user authentication information is known to the network and the device record indicates a high level of vulnerabilities, the access node may grant only very limited access to the network. Based upon the disclosure provided herein, one of ordinary skill in the art will recognize a variety of access levels from no access to full access that may be granted based upon network access policies applied by the access node.

An access proxy processing module 136 is configured to support a selected service proxy for endpoint device 104. An access node 110 may have a group of access proxies. An endpoint agent 106 may proxy TCP forwarding traffic and build a HTTPS tunnel so that TCP traffic is tunneled securely to access proxy in a HTTPS session. In order to scale up the network services, an access proxy may be load-balance traffic to multiple network servers while a load balancer may be deployed to distribute traffic to multiple access proxies that belong to different access nodes 110. The selected access proxy may be, but is not limited to: native access proxies, or an HTTPS tunnel for TCP forwarding. In some embodiments, both HTTPS and secure remote login and file transfer (SSH) protocols are supported as native access proxies. The unique device identification can be accessed from the device certificate issued by endpoint management system 120, the device record accessible from endpoint management system 120, or a client SSH key can be obtained from the protocol negotiation. HTTPS protocol supports many user authentication methods such as Basic, Form, NTLM, Kerberos, SAML, and OAuth/OIDC. SSH supports some user authentication methods according to SSH protocol.

Both device record and user identity learning are on-demand by access policy matching guided by user authentication rules until an access policy is matched or default deny policy is used. If the policy blocks the traffic, access proxy denies the access and may send friendly replacement message to the client. When the policy allows the access request, it forwards the traffic to a backend network service. If security scans are enabled for the traffic, access node 110 can deeply inspect traffic content using any known applications and audit the traffic as required.

Figure 1E:
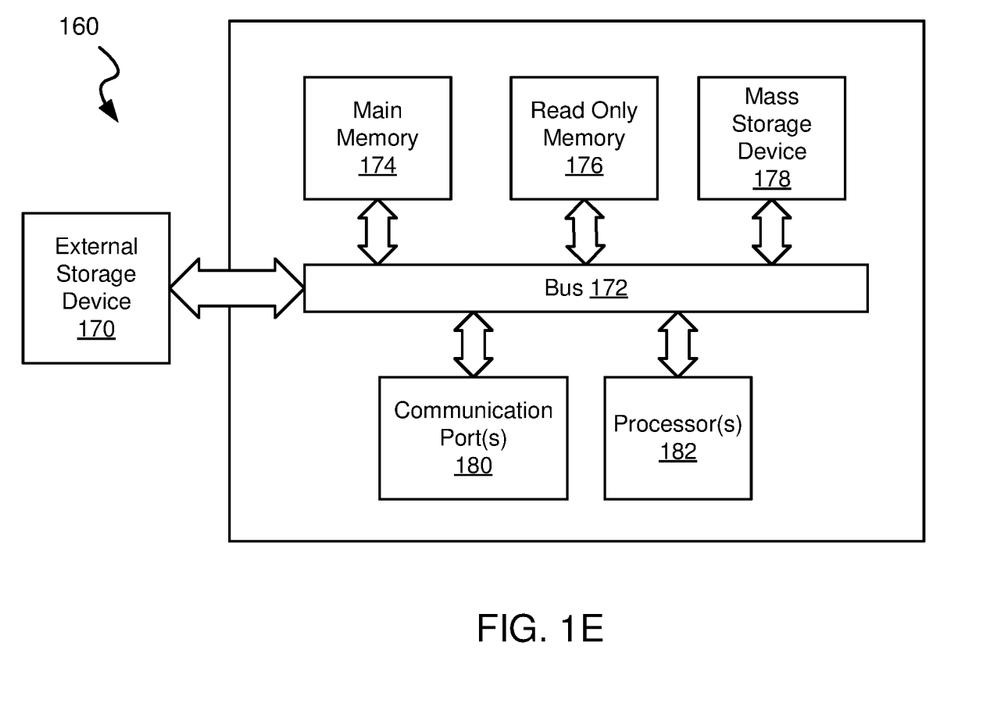

Turning to FIG. 1E, an example computer system 160 in which or with which embodiments of the present invention may be utilized is shown. In some case, one or more of access node 110, endpoint device 104, endpoint management system 120, and/or central policy control 108 may be implemented to include the features of example computer system 160. As shown in FIG. 1E, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc-Read-Only Memory (CD-ROM), Compact Disc—Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
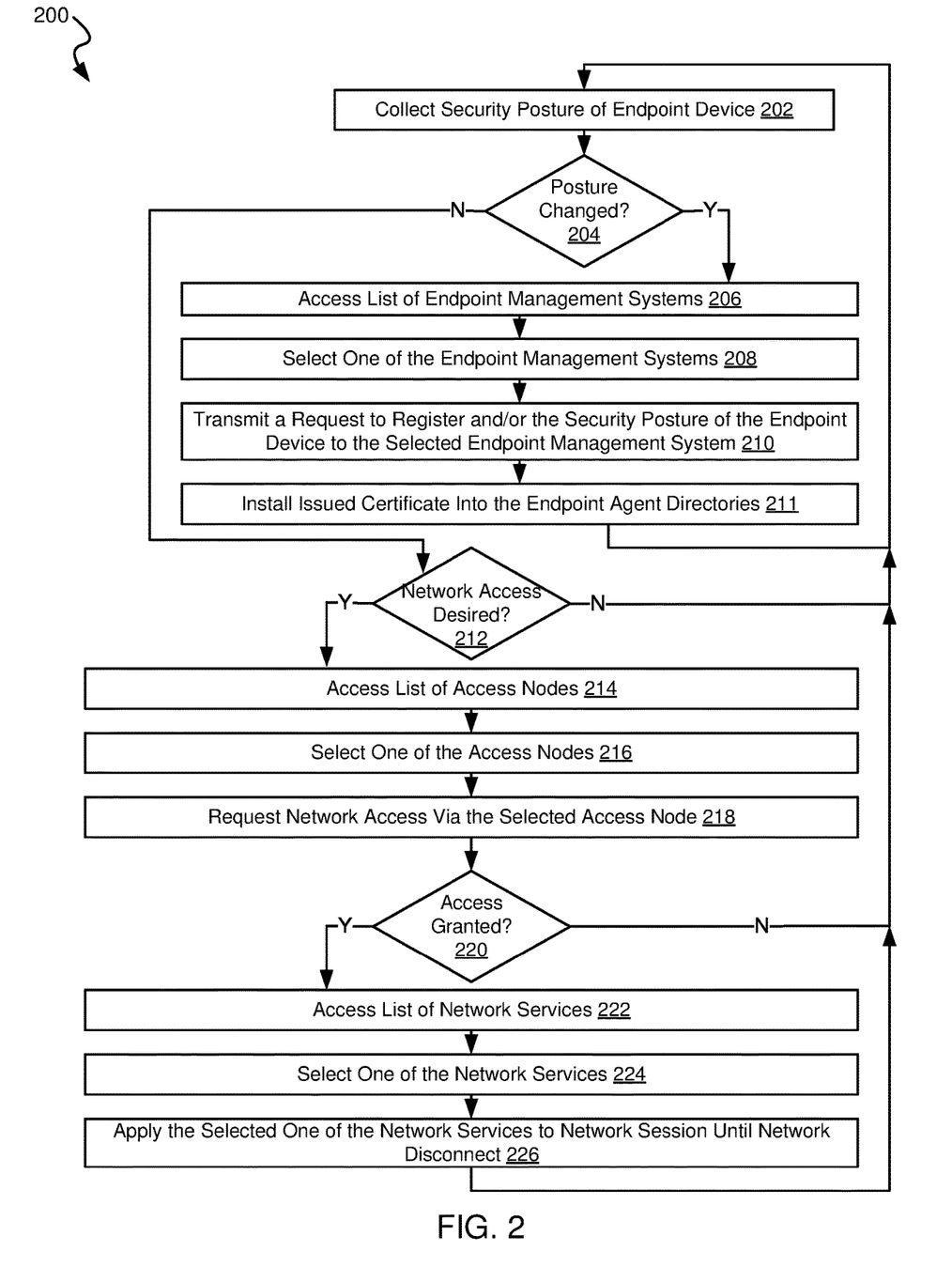
FIG. 2 is a flow diagram showing a method in accordance with various embodiments for facilitating zero trust network access processing using an endpoint agent operating on an endpoint device.

Turning to FIG. 2, a flow diagram 200 shows a method in accordance with various embodiments for facilitating zero trust network access processing using an endpoint agent operating on an endpoint device. Following flow diagram 200, the endpoint agent periodically collects the security posture of the endpoint device upon which it is executing (block 202). The security posture indicates one or more vulnerabilities and/or capabilities of the endpoint device. The endpoint agent determines this security posture by accessing various registries of endpoint device to identify applications executing on the endpoint device and the version of the applications, hardware included in the endpoint device and the version of hardware, and/or networks accessed by the endpoint device. Based upon the disclosure provided herein, one of ordinary skill in the art will recognize a variety of approaches that may be used for identifying security capabilities and/or vulnerabilities of the endpoint device that may be used in relation to different embodiments.

It is determined whether the security posture of the endpoint device has changed since the last time the security posture was collected (block 204). This may be determined, for example, by the endpoint agent comparing newly collected security posture information with that which was previously collected. Where the security posture has changed (block 204), the endpoint agent accesses a list of endpoint management systems accessible to the endpoint device (block 206). In some embodiments, the list of endpoint management systems is included with the endpoint agent when it is installed on the endpoint device. In various cases, the list of endpoint management systems is updated periodically. Such periodic updates may be done, for example, when the endpoint device accesses an endpoint management system.

The endpoint agent selects an endpoint management system from the accessed list of endpoint management systems (block 208). In some cases, the selection of one of the endpoint management systems is based upon, for example, a home location of the endpoint device, the current location of the endpoint device, and/or availability of a particular endpoint management system. Based upon the disclosure provided herein, one of ordinary skill in the art will recognize a variety of approaches that may be used to select one endpoint management system from the list of endpoint management systems.

The endpoint agent transmits a request to the selected endpoint management system (block 210). The request may be transmitted using any network protocol supported by both the endpoint agent and the endpoint management system. The request includes: the updated security posture of the endpoint device, and a request to register the endpoint device with the endpoint management system where it is the first time the endpoint agent has accessed the particular endpoint management system. The request to register the endpoint device may include a license token used to identify the endpoint device.

The registration process is performed by the endpoint management system and includes using one or more of: a license token received from the endpoint agent, identification of the endpoint agent as an authorized pre-installed device, and/or querying a central lightweight directory access protocol (LDAP) directory of device information. Based upon the disclosure provided herein, one of ordinary skill in the art will recognize a variety of approaches for identifying the endpoint device to the endpoint management system. Where the endpoint management system is able to identify and validate the endpoint device and it is the first time the endpoint agent has accessed the particular endpoint management system, the endpoint management system is identified as the active endpoint management system for the endpoint device, and the endpoint management system issues a device certificate or session certificate to the requesting endpoint agent. The certificate issued by the endpoint management system is installed into appropriate directories of the endpoint agent so that the endpoint agent will automatically use the issued certificate for later network accesses via access nodes (block 211).

A device certificate may be, but is not limited to, a TLS certificate issued by the endpoint management system to the specific endpoint agent. A unique device identification is embedded in the device certificate. Later when the device certificate is presented to an access node as part of a network access request, the device certificate is validated using an endpoint management system certificate authority and the device identification embedded in the device certificate is used to identify the endpoint device to the access node. A session certificate is a special certificate that issued by the endpoint management system after a user logs into the endpoint management system on a specific certificate. In such a case, both user name (i.e., the user logging in using the endpoint device) and the device identification are embedded into the session certificate. An access node can identify both the user and endpoint device from a validated session certificate without user authentication. The issued certificates are provided to the requesting endpoint agent.

In addition, the endpoint management system generates a device record for the endpoint device based upon the security posture of the endpoint device that was provided by the endpoint agent. Such a device record may contain, for example, the security posture provided by the endpoint agent, an indication of ownership of the endpoint device, the device identification, and/or other relevant information about the specific endpoint device. The endpoint management system updates the device record to include the latest information about the endpoint device. This device record may be retrieved from the endpoint management system by, for example, an access node through which the endpoint device is attempting to access the network. Retrieval may be done using, for example, the device identification embedded in the certificate issued to the endpoint agent and included in the device record. The information in the device record can be used by an access node to determine policy compliance with differing levels of network access.

Where the security posture has not changed (block 204), the endpoint agent determines whether the endpoint device is attempting to access a secure network (block 212). In some embodiments, the processing begins with an application on an endpoint device accessing a specific network service, such as, for example, a company web service or a remote desktop protocol (RDP) server. This may include, for example, a user of the endpoint device selecting a login access for a secure network, and when this occurs the endpoint agent executing on the endpoint device detects the network access selection by the user. Based upon the disclosure provided herein, one of ordinary skill in the art will recognize a variety of approaches that may be used for determining that a request for access to a secure network has been received.

Where a network access request has been received (block 212), a list of access nodes is accessed by the endpoint agent (block 214). This list of access nodes may be maintained locally by the endpoint agent. This list of access nodes can be updated each time the endpoint agent accesses its active endpoint management system. In some cases, the endpoint management systems dynamically update a list of access nodes by monitoring access node availability using a secure connection between the endpoint management system and an access node. Based upon the disclosure provided herein, one of ordinary skill in the art will recognize a variety of approaches for identifying access nodes that may be used in relation to different embodiments. In some embodiments, the endpoint agent selects an access node from the list of access nodes (block 216). In other embodiments, the endpoint agent displays the list of access nodes via a GUI of the endpoint device, and a user is prompted to select one of the displayed access nodes. In some embodiments, an available network service accessible via the endpoint device is mapped to one or more real servers through uniform record locators (URLs). In the view of user, they see the web service running on a fully qualified domain name (FQDN) while they see an internal IP for TCP forwarding service. In the case of TCP forwarding service, endpoint agent will redirect the traffic and tunnel through a virtual IP that is published through FQDN.

The endpoint agent requests network access via the selected access node (block 218). The request may include both user authentication information and device identification data. Such user authentication data may include, but is not limited to, a user name and password. The device identification data may include, but is not limited to, the device certificate issued by the endpoint management system. The access node uses the combination of the user login and the issued certificate to determine a level of network access based upon network policies. This process of determining the level of network access is described below in relation to FIG. 4.

Where network access is granted by the access node (block 220), a list of network services is accessed by the endpoint agent (block 222). Such a list of network services may be provided by the access node to the endpoint agent. In some cases, the list of network services provided by the access node is a subset of available network services where the subset is selected based upon the identity of the user, the identity of the endpoint device, or a combination of the identity of the user and the identity of the endpoint device.

A network service is selected (block 224). In some cases, endpoint agent may display a request to identify a network service to a display of the endpoint device. A user may then select a network service via the display or another input device. Alternatively or in addition, the endpoint agent may automatically select a network service based upon context and/or historical patterns of prior user selections. Proper selection of network services allows the endpoint device to provide desired services that include, but are not limited to: bypassing any existing virtual private network (VPN) to access a selected network service directly, and redirecting transmission control protocol (TCP) services other than native access proxy services through an HTTPS tunnel to an access node. The selected network service is applied to a network session (block 226). Use of the network continues until the endpoint device is disconnected from the network.

Figure 3:
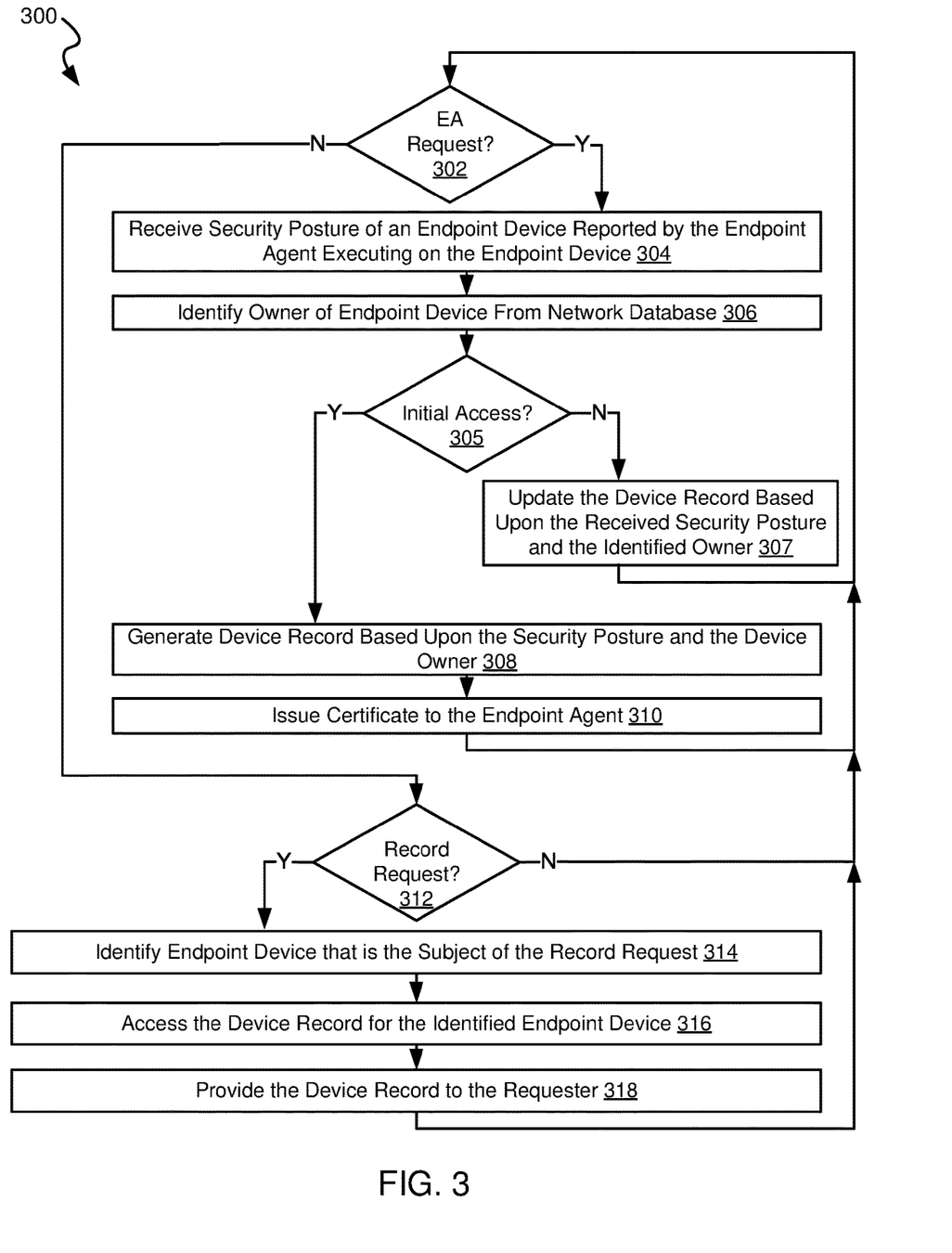
FIG. 3 is a flow diagram showing a method in accordance with some embodiments for zero trust network access processing using an end point management system in relation to one or more endpoints and one or more access nodes.

Turning to FIG. 3 is a flow diagram 300 shows a method in accordance with some embodiments for ranking solutions for facilitating zero trust network access processing using an end point management system in relation to one or more endpoints and one or more access nodes. Following flow diagram 300, it is determined if a request has been received from an endpoint device by an endpoint management system (block 302). Where the request is from an endpoint agent that has not previously registered with the endpoint management system, it is considered a registration request which includes generation of a device record based upon a security posture provided as part of the request. Alternatively, where the request is from an endpoint agent that has previously registered with the endpoint management system, it is considered an update request which includes updating the device record based upon the security posture provided as part of the request. In either case, the security posture for the endpoint device for which the endpoint agent is requesting is provided to and received by the endpoint management system (block 304).

In addition, one or more elements about the endpoint device are used by the endpoint management system to identify an assigned owner of the endpoint device (block 306). Determining the assigned owner may be done, for example, by accessing a network database using a device tag or other information provided by the endpoint agent. Based upon the disclosure provided herein, one of ordinary skill in the art will recognize a variety of approaches for identifying device ownership that may be used in relation to different embodiments.

It is then determined whether this is the first time that the endpoint device has accessed the endpoint management system (block 305). Where it is not the first time (block 305), the endpoint device is already registered to the endpoint management system, the endpoint management system is the active endpoint management system for the endpoint device, and the endpoint management system already includes a device record for the endpoint device. In such a case, the existing device record is updated to reflect the recently received security posture and device ownership (block 307).

Alternatively, where it is the first time that the endpoint agent has accessed the endpoint management system (block 305), the endpoint management system registers the endpoint device and the endpoint management system becomes the active endpoint management system for the endpoint device. This includes generating a device record based upon the security posture and the device owner (block 308). Such a device record may contain, for example, the security posture provided by the endpoint agent, an indication of ownership of the endpoint device, the device identification, and/or other relevant information about the specific endpoint device. The endpoint management system updates the device record to include the latest information about the endpoint device. This device record may be retrieved from the endpoint management system by, for example, an access node through which the endpoint device is attempting to access the network. Retrieval may be done using, for example, the device identification embedded in the certificate issued to the endpoint agent and included in the device record. The information in the device record can be used by an access node to determine policy compliance with differing levels of network access.

In addition a certificate is issued by the endpoint management system to the endpoint agent (block 310). The certificate may be a device certificate or session certificate that is installed into appropriate directories of the endpoint agent so that the endpoint agent will automatically use the issued certificate for later network accesses via access nodes as more fully described above in relation to FIG. 2.

Alternatively, where it is determined that a request has not been received from an endpoint device (block 302), it is determined whether a device record has been requested by an access node (block 312). Such a device record request may include, for example, the unique device identification included in a certificate issued to an endpoint device. Thus, when an endpoint device attempts to access the network by providing its issued certificate to an access node, the access node can access the unique device identification in the certificate and use it to request the corresponding device record.

The endpoint management system receiving the device record request identifies the endpoint device that is the subject of the request using the unique device identification provided by the access node (block 314). This request for the device record can be made: via direct communication between the access node and the active endpoint management system; or indirectly where the access node requests the device record from any of the endpoint management systems which in turn obtains the device record from the active endpoint management system. Alternatively, while not shown in the flow diagram, the device record may be provided by the endpoint management system to the endpoint agent. When the endpoint agent attempts to access the network, it provides the device record to the access node. In such a case, the device record may be signed by the active endpoint management system to protect the device record from unauthorized modification.

The device record for the identified endpoint device is accessed by the endpoint management system (block 316) and provided to the requesting access node (block 318). This may be done, similar to that described above, either directly from the active endpoint management system or indirectly.

Figure 4:
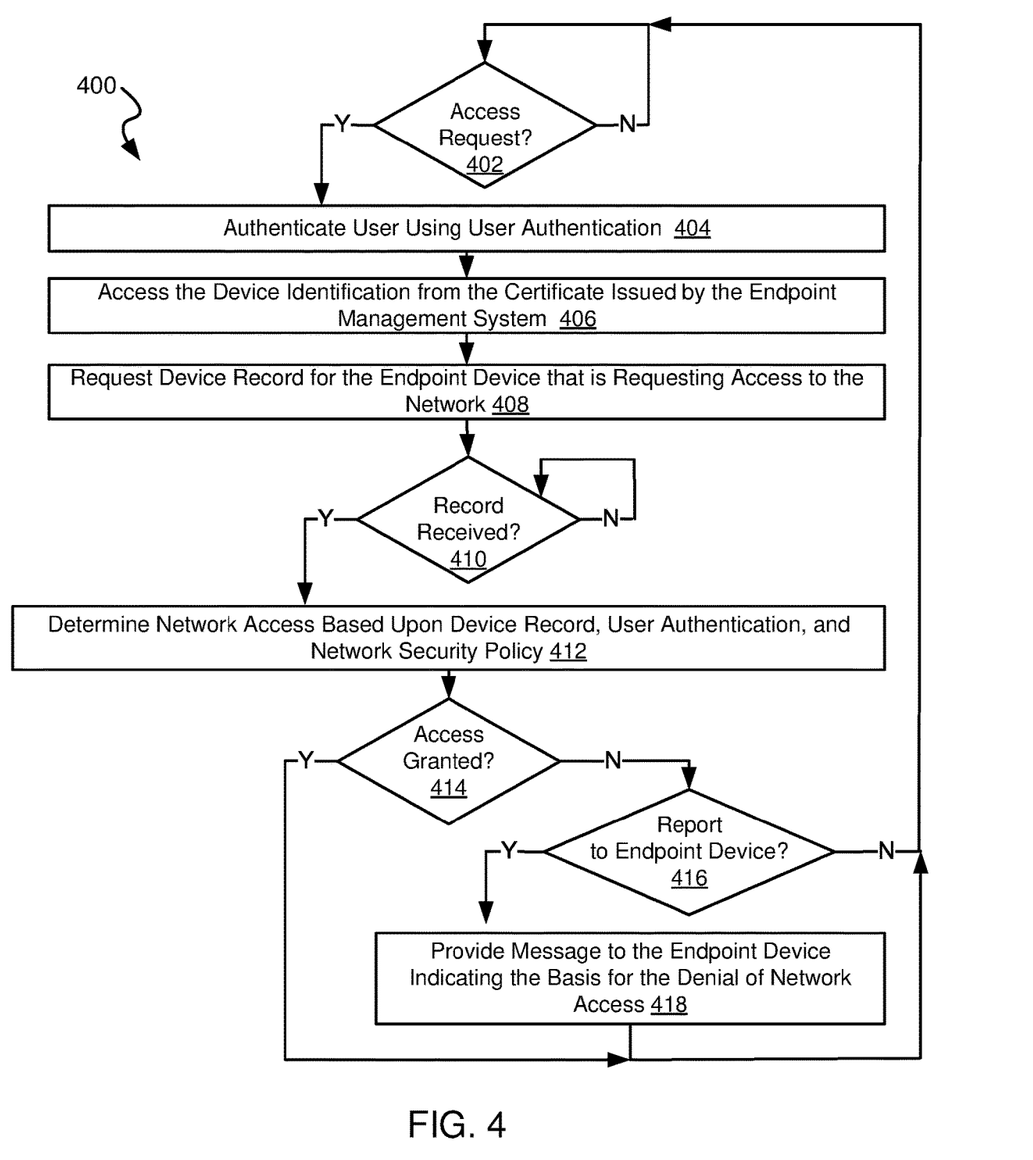
FIG. 4 is a flow diagram showing a method in accordance with various embodiments for facilitating zero trust network access processing at an access node based upon a device record generated by an endpoint management system.

Turning to FIG. 4, a flow diagram 400 shows a method in accordance with various embodiments for facilitating zero trust network access processing at an access node based upon a device record generated by an endpoint management system. Following flow diagram 400, it is determined whether a network access request has been received by an access node (bock 402). Such a device request may include, but is not limited to, a user authentication, and a device certificate issued by an endpoint management system provided by an endpoint agent. The user authentication may include, for example, a user name and password.

The access node uses the user authentication received as part of the access request to authenticate the user (block 404). This may be done using any user authentication known in the art. The access node accesses the device identification that is embedded in the certificate issued by the endpoint identification system (block 406). The access node requests the device record for the device indicated by the device identification derived from the certificate (block 408). This request for the device record can be made: via direct communication between the access node and the active endpoint management system; or indirectly where the access node requests the device record from any of the endpoint management systems which in turn obtains the device record from the active endpoint management system. Alternatively, the device record may be provided by the endpoint management system to the endpoint agent, and the endpoint agent provides the device record to the access node as part of the network access request. In such a case, the device record may be signed by the active endpoint management system to protect the device record from unauthorized modification.

The access node waits until the device record is received (block 410). Once the device record is received (block 410), the access node determines a scope of network access that will be granted to the requesting endpoint device based upon a combination of: the device record (e.g., the security posture of the endpoint device, and/or ownership of the endpoint device), user authentication, and network security policy (block 412). This determination of scope of access may be done in accordance with any zero trust security approach known in the art including, but not limited to, approaches used in BeyondCorp™ Enterprise systems. As suggested above, a grant of network access may vary in scope depending upon the combination of user authentication information and device identification data. For example, where the user authentication information is known to the network, but does not match the assigned owner of the endpoint device, the access node may grant access to substantially all of the network, but not to download or upload source code to the network. As another example, where the user authentication information is both known to the network and matches the assigned owner of the endpoint device, the access node may grant complete access to the network. As yet another example, where the user authentication information is known to the network and the device record indicates a low level of vulnerabilities, the access node may grant broad access to the network. In contrast, where the user authentication information is known to the network and the device record indicates a high level of vulnerabilities, the access node may grant only very limited access to the network. Based upon the disclosure provided herein, one of ordinary skill in the art will recognize a variety of access levels from no access to full access that may be granted based upon network access policies applied by the access node.

Where access is not granted (block 414), it is determined whether the endpoint device is to be alerted to the basis for the denial (block 416). Where an alert is to be given (block 416), a message is provided to the endpoint device indicating the basis for the denial (block 418).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for zero trust security processing for an endpoint device in a network, the method comprising:
   receiving, by a first processing device, a first request from an endpoint device, wherein the endpoint device includes an endpoint agent executing on the endpoint device, wherein the endpoint agent is configured to update a security posture of the endpoint device, and wherein the first request includes the security posture of the endpoint device; and
   updating, by the first processing device, a device record corresponding to the endpoint device to reflect the security posture received from the endpoint device;
   generating, by the first processing device, a security certificate for the endpoint device;
   transmitting, by the first processing device, the security certificate to the endpoint agent on the endpoint device, wherein the security certificate is caused to be installed into directories of the endpoint agent so that the endpoint agent automatically uses the security certificate for subsequent network accesses;
   receiving, by a second processing device remote from the first processing device, a second request from the endpoint device, wherein the second request includes the security certificate with a unique device identification for the endpoint device and requests access to a network service;
   formatting, by the second processing device, a device record request based at least in part on information derived from the security certificate of the second request, wherein the device record request includes at least the unique device identification included in the security certificate; and
   issuing, by the second processing device, the device record request.

2. The method of claim 1, the method further comprising:
   determining, by the processing device, an owner of the endpoint device based at least in part on information received as part of the request from the endpoint device, wherein updating the device record is done based in part upon the owner.

3. The method of claim 1, wherein the security posture includes at least one of: an indication of an out of date operating system executing on the endpoint device, an insecure application executing on the endpoint device, a vulnerable hardware element included as part of the endpoint device, or an up to date virus detection and mitigation application executing on the endpoint device.

4. The method of claim 1, wherein the first request from the endpoint device is a request to register the endpoint device.

5. The method of claim 1, wherein the first request from the endpoint device is an initial request from the endpoint device.

6. The method of claim 1, the method further comprising:
 receiving, by the first processing device, the device record request; and
 providing, by the first processing device, the device record in response to the device record request.

7. The method of claim 1, the method further comprising:
 receiving, by the second processing device, the device record; and
 granting, by the second processing device, access to the network service based at least upon a combination of the security certificate and the device record.

8. The method of claim 1, wherein the first processing device is an endpoint management system, wherein the second processing device is an access node, and wherein the endpoint management system and the access node are communicably coupled.

9. The method of claim 2, wherein determining the owner is done by accessing a network database.

10. The method of claim 4, wherein the method further comprises:
 installing the security certificate into a register of the endpoint agent.

11. A system for zero trust security processing for an endpoint device in a network, the system comprising:
 an endpoint device including a first processing device and a non-transitory computer readable storage medium, wherein the non-transitory computer readable medium includes instructions which when executed by the first processing device cause the endpoint device to:
 update a security posture of the endpoint device, wherein the endpoint device includes an endpoint agent executing on the endpoint device, wherein the endpoint agent is configured to update a security posture of the endpoint device, and wherein the first request includes the security posture of the endpoint device;
 provide the security posture of the endpoint device to a second processing device;
 receive a security certificate generated based at least in part on the security posture of the endpoint device;
 install the security certificate into directories of the endpoint agent so that the endpoint agent automatically uses the security certificate for subsequent network accesses; and
 provide to a third processing device a request to access a network that includes the security certificate with a unique device identification for the endpoint device.

12. The system of claim 11, wherein the security posture includes at least one of: an indication of an out of date operating system executing on the endpoint device, an insecure application executing on the endpoint device, a vulnerable hardware element included as part of the endpoint device, or an up to date virus detection and mitigation application executing on the endpoint device.

13. The system of claim 11, wherein the security certificate is generated by the second processing device based at least in part on the security posture of the endpoint device and an owner of the endpoint device.

14. The system of claim 11, wherein the second processing device generates a device record for the endpoint device based at least in part on the security posture of the endpoint device and an owner of the endpoint device, and wherein the third processing device requests the device record based at least in part on the security certificate received from the endpoint device.

15. The system of claim 11, wherein the second processing device and the third processing device are the same device.

16. The system of claim 11, wherein the second processing device is included in an endpoint management system, wherein the second processing device is included in an access node, and wherein the endpoint management system and the access node are communicably coupled.

17. A non-transitory computer-readable storage medium embodying a set of instructions, which when executed by one or more processing resources of a computer system, causes the one or more processing resources to perform a method comprising:
 receiving, by a first processing device, a first request from an endpoint device, wherein the endpoint device includes an endpoint agent executing on the endpoint device, wherein the endpoint agent is configured to update a security posture of the endpoint device, and wherein the first request includes the security posture of the endpoint device; and
 updating, by the first processing device, a device record corresponding to the endpoint device to reflect the security posture received from the endpoint device;
 generating, by the first processing device, a security certificate for the endpoint device;
 transmitting, by the first processing device, the security certificate to the endpoint agent on the endpoint device, wherein the security certificate is caused to be installed into directories of the endpoint agent so that the endpoint agent automatically uses the security certificate for subsequent network accesses;
 receiving, by a second processing device remote from the first processing device, a second request from the endpoint device, wherein the second request includes the security certificate with a unique device identification for the endpoint device and requests access to a network service;
 formatting, by the second processing device, a device record request based at least in part on information derived from the security certificate of the second request, wherein the device record request includes at least the unique device identification included in the security certificate; and
 issuing, by the second processing device, the device record request.

18. The non-transitory computer-readable storage medium claim 17, wherein the set of instructions, which when executed by one or more processing resources of the computer system, causes the one or more processing resources to perform the method further comprising:
 determining, by the processing device, an owner of the endpoint device based at least in part on information received as part of the request from the endpoint device, wherein updating the device record is done based in part upon the owner.

19. The non-transitory computer-readable storage medium claim 17, wherein the security posture includes at least one of: an indication of an out of date operating system executing on the endpoint device, an insecure application executing on the endpoint device, a vulnerable hardware element included as part of the endpoint device, or an up to date virus detection and mitigation application executing on the endpoint device.

* * * * *